TEACHING DEVICES

Filed Sept. 30, 1964 4 Sheets-Sheet 1

INVENTOR.
KENNETH M. BEACH Jr.

BY Wm J. Nolan
ATTORNEY

INVENTOR
KENNETH M. BEACH Jr.
BY Wm J. Nolan
ATTORNEY

TEACHING DEVICES
Filed Sept. 30, 1964 4 Sheets-Sheet 3
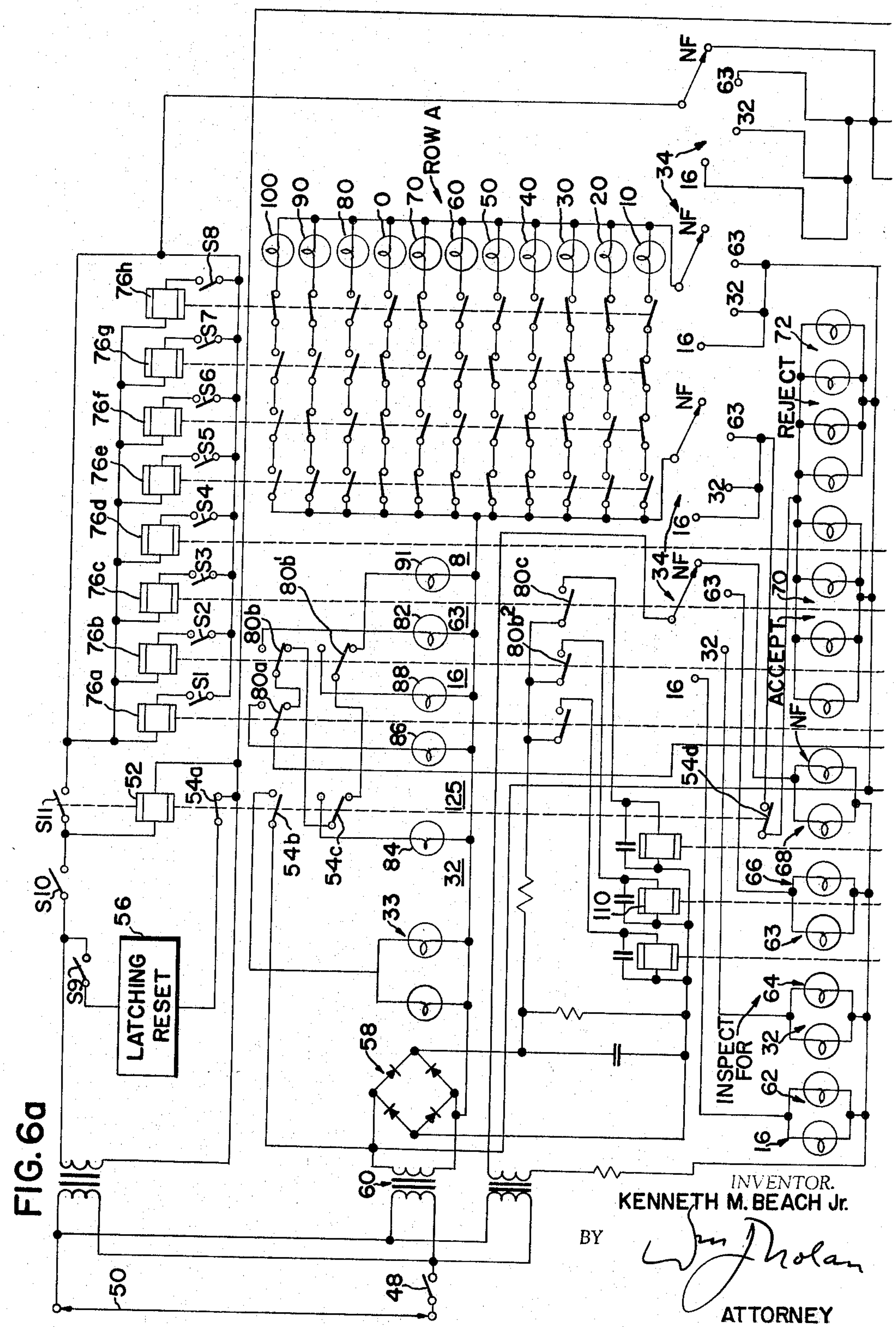
INVENTOR.
KENNETH M. BEACH Jr.
BY
ATTORNEY

TEACHING DEVICES

Filed Sept. 30, 1964 4 Sheets-Sheet 4

INVENTOR.
KENNETH M. BEACH Jr.
BY
ATTORNEY

United States Patent Office 3,286,371

Patented Nov. 22, 1966

3,286,371

TEACHING DEVICES

Kenneth M. Beach, Jr., Santa Clara, Calif., assignor to Varian Associates, Palo Alto, Calif., a corporation of California Filed Sept. 30, 1964, Ser. No. 400,430
5 Claims. (Cl. 35—8)

This invention relates to teaching devices, and in particular to an apparatus that teaches visual discrimination and evaluation.

Generally, teaching devices are employed to teach subject matter following a predetermined program of instruction. However, teaching devices may also be utilized to teach and train an individual to evaluate and judge values and quality of materials, among other things.

For example, visual inspection of the smoothness of metal surfaces is a task that must be performed frequently by engineers and inspectors in industry. Accuracy of smoothness judgements made by inspectors and engineers is a matter of considerable importance. Blueprints specify a desired surface finish in terms of a smoothness number. This number states that the prescribed surface must be machined to a finish as smooth as, or smoother than, that represented by the number. The smoohtness specified on a blueprint is determined by the function the surface is to perform. For example, a bearing surface must be much smoother than a casting surface that is to be painted; the smoothness of a surface that is to be plated is more critical than one that will eventually be knurled. The cost of machining a surface to a specified smoothness rises sharply with the degree of smoothness required; the smoother the surface the more costly it is to prepare. Since a rejected material lot is generally returned to the vendor, the material must be reworked at an added cost to the vendor. Thus, materials that are falsely rejected incur unnecessary costs. Materials that are falsely accepted, on the other hand, also incur unnecessary costs because faulty materials lead to an increase in product reject rate.

Accurate assessment of metal surface smoothness can be made by a machine called a profilometer, which measures the averagedepth of the depressions along a surface. The use of this device involves a time-consuming procedure, however, and this is why the primary basis for smoothness decisions is often provided by an inspector's judgment rather than by profilometer readings. It would be desirable to develop and improve the ability of an inspector to judge the finish of a metallic surface accurately.

Although the present application will be directed to an apparatus that teaches visual discrimination, especially as applied to evaluation of surface smoothness of materials, it should be understood tht the inventive apparatus may be utilized for other purposes of evaluation, recognition or judgment.

An object of this invention is to provide a novel and improved teaching device.

Another object of this invention is to provide a teaching device which enables a learner to improve his ability of evaluation, recognition and judgement of inspected materials.

According to this invention, a teaching device comprises a logic circuit responsive to a coded input signal. The code, which is in binary form, is encompassed in an external sample block that is formed with a multiplicity of holes or recesses, each hole having one of two depths. The holes of the coded block are adapted to engage a like number of depressible pins coupled to microswitches in the device, which respond to the holes with the smaller recess only. By selecting an indicator button representing an evaluation or judgement the operator energizes certain relay networks in the logic circuit and consequently receives feedback or response to his selection. The response may take one or more forms indicating the accuracy of his choice; a percentage of expert agreement with his judgment; a cumulative count of correct and incorrect responses; and the actual value of the item being judged.

The invention will be described in greater detail with reference to the drawing in which.

Figure 6B:
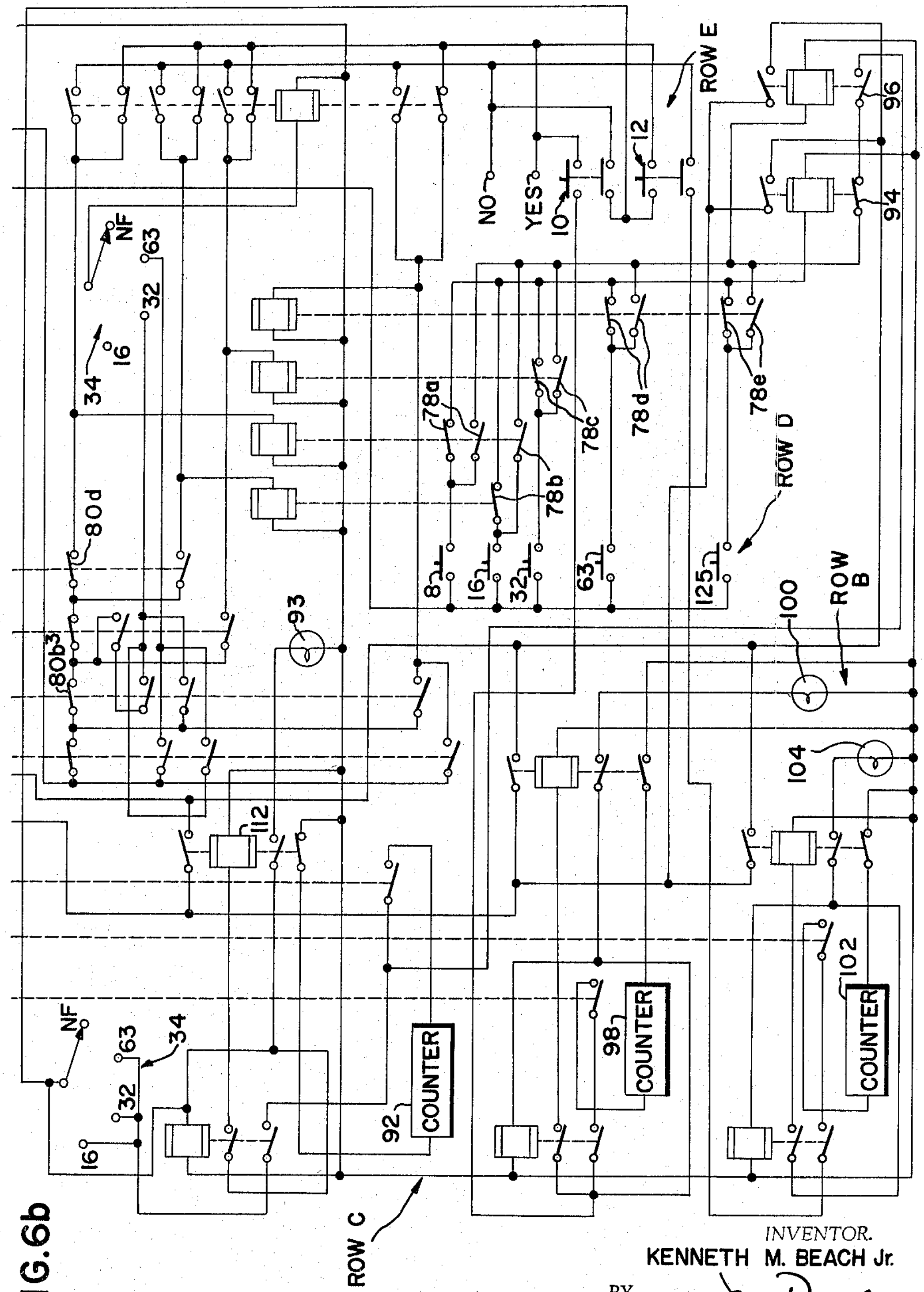

FIGS. 6*a* and 6*b* are schematic circuit diagrams of such logic system.

The device of this invention operaties in two major modes, namely, Mode I and Mode II. In Mode I, the learner accpets or rejects a sample on the basis of a stated criterion. The machine's possible responses are (a) right or wrong; (b) the percentage of experts that would agree with the learner's choice; or (c) the exact finish of the sample. Also, a count of the total number of correct and erroneous response is presented. In Mode II, the learner is asked to identify the rated smoothness of each sample. In such case, the device provides confirmation to the learner when the correct response is made, and also indicates the number of correct responses made on the first try for each sample tested.

Figure 1:
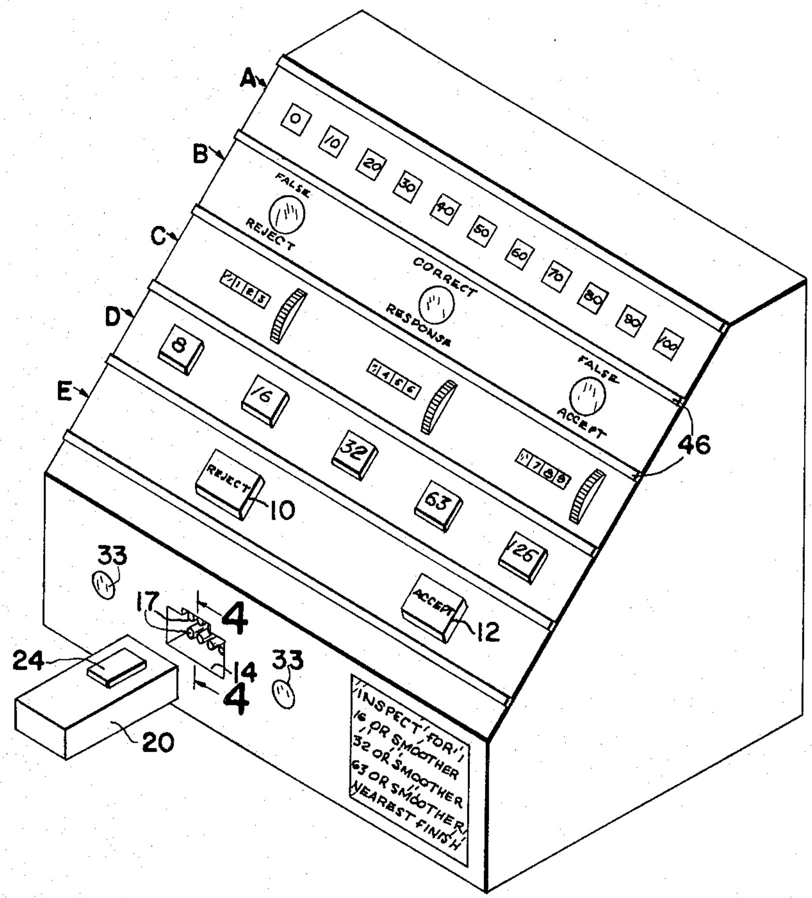
FIG. 1 is a front perspective view of the inventive apparatus.

As depicted in FIG. 1, a teaching device made in accordance with this invention comprises a front or display face having five horizontal rows, A, B, C, D, E, respectively, each row providing a different function. Row E at the lower portion includes a Reject button 10 and an Accept button 12 which are used with Mode I operation. Row D includes a set of five buttons bearing numerals 8, 16, 32, 63 and 125 respectively, these buttons being used for Mode II operation, the numerals representing degrees of surface smoothness. Row D is used when the operator is required to indicate the closest, actual surface finish of the sample. Row C includes three counters which provide a cumulative count of correct responses and incorrect responses. Row B contains light indicators which present the correctness or error of the operator's choice. If a correct response is made, the center light is illuminated. If an incorrect response is made by depressing the Accept button 12, when the Reject button 10 should have been pushed, then the "False Accept" light will go on. Conversely, depressing the Reject button 10 in error will light the "False Reject" indicator. Row A at the top includes a series of eleven indicators, one of which lights when a choice is made in Mode I, thereby presenting the percentage, given in increments of 10%, of experts that would agree with the choice of the operator.

Figure 2:
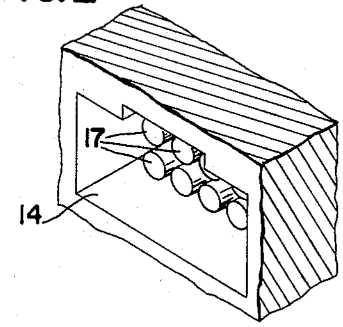
FIG. 2 is an enlarged fragmentary view of the receptacle containing the pin structure incorporated in the inventive device.
Figure 4:
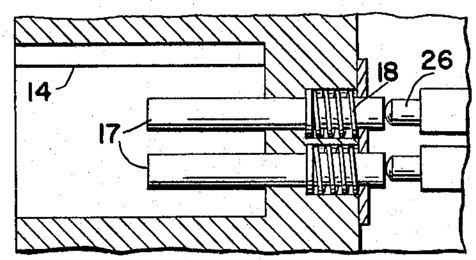
FIG. 4 is a cross-sectional view taken along the lines 4—4 of FIG. 1.

The inventive device incorporates a slot or receptacle 14 wherein a multiplicity of depressible pins 17 are seated. The pins 17 (depicted in FIG. 2) are aligned in two horizontal rows of four each, and the front ends of the pins are disposed in a common plane set back from the frontal surface of the apparatus. Each pin 17 is secured in a channel in the rear wall of the receptacle 14, and is tensed or loaded by a spring 18, as illustrated in FIG. 4. The spring 18, which is coupled in close engagement with the pin 17 and is seated in a hollow forming a shoulder with the pin channel, serves to urge the pin outwardly towards the front of the apparatus.

Figure 3:
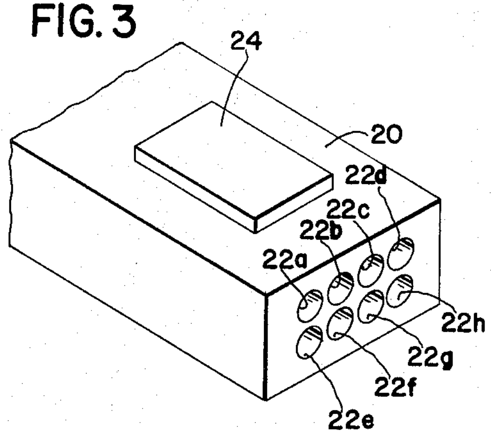
FIG. 3 is an enlarged fragmentary view of a sample block, as utilized with the invention.

In accordance with this invention, a number of mounting blocks 20 such as shown in FIGS. 1 and 3 are formed with a like multiplicity of holes or recesses 22*a–h* for engagement with the pins 17. Each block 20 has a sample slab of metal 24 cemented or epoxied thereto, such sample 24 having a predetermined rated smoothness. The smoothness rating determines the combination of depths of the recesses 22 in each block 20. For example, if a sample were rated at 63 smoothness, then recess 22*b* in the top row and recesses 22*e* and 22*g* in the bottom row would be drilled only to a ⅜" depth, whereas the remaining holes would be drilled to a ½" depth.

Figure 5:
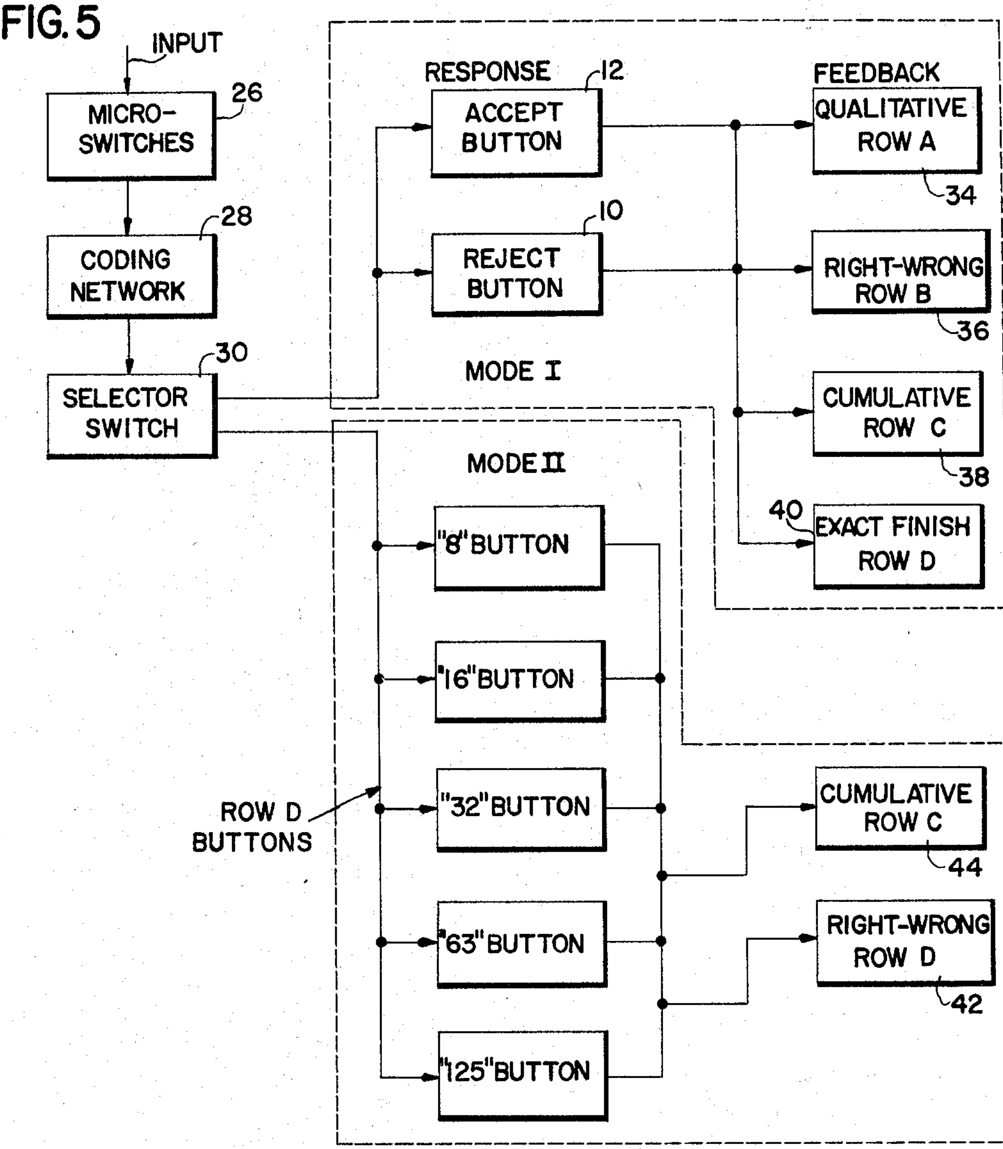
FIG. 5 is a block diagram of the logic system employed with the apparatus.

During operation, a mounting block 20 is inserted in the receptacle 14 to engage the pins 17. However, only the recesses 22 that are coded by ⅜" drilling will urge the associated pins rearward against spring tension. As a result, the pins 17 that have been depressed will actuate associated microswitches 26. In turn, the activated microswitches 26 energize a coding network 28 (see FIG. 5) that sets the logic circuit of the device in accordance with the coded mounting blocks 20 engaging the pins 17.

In operation, the instructor sets a selector switch 30, at the rear of the device and out of view of the learner, to one of four settings, i.e., 16, 32, 63 or NF. Let us assume that the 63 selector position is chosen. The learner is then supplied with a number of mounting blocks 20 with various samples attached thereto to be inspected and evaluated. The learner inserts mounting blocks, one at a time, in the receptacle 14 after inspection of each block. For each block inserted, indicator lights 33 at the side of the receptacle 14 are lit to indicate that proper engagement of the recesses 22 and the pins 17 have been made. At the same time, the line reading "62 or smoother" under "Inspect For" is also illuminated, as well as the Reject and Accept buttons 10 and 12.

The learner then depresses either the Reject button 10, if he believes a sample is not of the 63 finish or smoother; or the Accept button 12 if he judges it as 63 or smoother. For each choice, rows A–D will provide feedback and an indication of the accuracy of the subject's judgment. By way of example, if the selected sample is 63 finish or smoother, and the Accept button 12 is pushed on a first try, the 90% indicator for row A will light, represented by block 34 (Qualitative Row A); Correct Response for row B will light, depicted by block 36 (Right-Wrong Row B); the counter in row C or Correct Response will advance by one digit, evidenced by block 38 (Cumulative Row C); and the 63 light in row D would be displayed, illustrated by block 40 (Exact Finish Row D). On the other hand, if the Reject button 10 were selected on the first try with the 63 finish sample block mounted to the pins 17, the 10% light of row A, the False Reject of row B, and the 63 button of row D would be illuminated; and the counter, row C, under False Reject would advance. If the sample is other than 63 or smoother, corresponding responses are observed on the display.

For Mode II, the instructor would set the selector switch 30 at NF (Nearest Finish) and the same procedure for inspecting and inserting sample blocks are followed. However, the learner selects a button only from row D to indicate what he believes to the nearest finish to the sample inspected. If a correct choice is made, the depressed button in row D lights, shown by block 42. Also the counter in row C under Correct Response, row B, will advance one digit, represented by Cumulative block 44, if the correct choice was made on the first try only. If an incorrect selection is made, there is no light indication and no count. A second or subsequent choice may be made for the same sample until a depressed button in row D is illuminated to signify a correct evaluation, but in such case the counter does not advance and thus no reward or credit is obtained.

In actual operation, those rows not being used for the learning process may be concealed from the learner's view by inserting opaque plastic strips in slots 46 that bound each row of buttons and lights.

With reference to the schematic circuit of FIGS. 6*a* and 6*b*, the circuit is depicted as set for Mode II operation with the selector switch 30 at the NF position. At the start of operation, the instructor closes a toggle switch 48 to couple the logic circuit to an A.C. power supply 50. With the sample block 20 mounted properly in the receptacle 14, switches S9, S10 and S11 are closed by means of a projecting bar (not shown) at the rear of the block. A switching relay 52 is energized, and activates a series of switches 54*a–d* coupled to the relay solenoid 52 in ganged relation. Switch 54*a* is urged to open a latching reset circuit 56, and switch 54*b* coupled indicator lights 33 to the power supply 50 through a diode bridge 58 and transformer 60. The indicator lights 62, 64, 66 and 68 for the instruction display "Inspect For" and lights 70 and 72 for the Reject and Accept buttons 10 and 12 respectively are coupled to the power supply 50 through the selector switch 30 and the stepdown voltage transformer 74.

If we assume that a 63 finish sample block 20 is engaged with the pins 17, then switches S2, S5 and S7 associated with solenoids 76*b*, *e* and *g* will be closed. For Mode II operation, we are interested in the row D display and the correct response counter in row C. Therefore, rows A, B and E are preferably covered by opaque strips to conceal these displays from the viewer. With such Mode II conditions established, only switches S1 through S4 corresponding to the top row of code recesses 22 in the mounting block 20 are of interest.

In Mode II operation, after inspection of the sample on the inserted mounting block, the learner selects one of the five buttons in row D marked with range numbers 8, 16, 32, 63 and 125, and thus actuates one of the relay switches 78*a–e* in FIG. 6*b*. If the operator selects the correct button, that is, the 63 button, then the relay switches 80*b*, 80*b*$^2$ . . . 80*b*$^n$ that are coupled in ganged relationship to the solenoid 76 are activated, and the circuit to the indicator light 82 is closed, illuminating the "63" button in row D. However, if any of the other four buttons in row D is depressed, switch 80*b* remains open and since S1, S3 and S4 are also open, none of the lights 84, 86, 88 or 91 in row D go on.

Furthermore, if a correct choice is made, the circuit for the correct response counter 92 is closed causing an advance of a digit, and the lighting of a correct response indicator 93. However, when the first response is made in Mode II operation by depressing a button in row D, a momentary pulse opens the relay switch 94 and closes the relay switch 96. As a result, the counter circuits are inactivated for any subsequent row D button selections as long as the same mounting block remains inserted in the receptacle of the device. If an incorrect selection is made on the first or subsequent attempts, the counter circuits do not operate in the Mode II operation.

For Mode I operation, if we assume that the selector switch 30 is set at 63, and microswitches S2, S5 and S7 are activated by a 63 finish sample block, then if the Accept button 12 is depressed, the circuit that includes the 90 button indicator light in row A is completed to illuminate such light. The correct counter 92 will receive a pulse from relay 110 and latching relay 112, thus advancing to the next digit. Row D is not in use in Mode I operation, and is covered by an opaque strip.

If the Reject button 10 is selected when the selector is set at 63, and the selected sample is 63 finish, then the complement of 90%, that is, the 10% indicator light in row A will be lit. Also, the False Reject counter 98 will be activated with its corresponding light 100. Conversely, if the sample is not 63 finish, and the operator selects the Accept button 12, the False Accept counter 102 and its associated light 104 will be energized.

After each mounting block is withdrawn, switches S1 through S11 are opened, and the latching relay 52 will cause the latching reset circuit 56 to reset the associated relays to an initial condition. In such event, none of the indicator lights will be on, and all the circuitry will be effectively inoperative.

The logic circuit described above can be modified to achieve other functions than those described to train individuals in accurate evaluation, judgment and selection. Also, the circuitry of the switching system, its configurations and parameters may be changed without departing from the scope of this invention.

What is claimed is:

1. A teaching machine for teaching a student, said machine including means for accepting a sample to be evaluated by said student, said machine including means for both student and machine evaluation of said accepted sample in accordance with a predetermined type of evaluation criterion and means for converting both said student and machine evaluations into at least two different types of answers for presentation to said student at the same time, said machine including a first feedback means and presentation means for presenting to said student one answer of said at least two different types of answers which answer is based on precoded information stored in said machine and both said student and machine evaluations of said sample, said machine including second feedback and presentation means for presenting to said student the other answer of said at least two different types of answers which answer is based on said student and machine evaluations of said sample independently of said precoded information stored in said machine, said machine further including means for permitting the student to select either or both of said at least two different types of answers for presentation to said student.

2. The teaching machine defined in claim 1 wherein said machine further includes means for presenting a cumulative count of the number of correct and incorrect student evaluations of said sample with respect to said other answer of said at least two different types of answers.

3. The teaching machine defined in claim 1 wherein said sample to be evaluated is provided with coding means and said machine includes means for reading said coded sample in accordance with said predetermined type of evaluation criterion, said sample coding means including a block upon which said sample is mounted, said block having a series of recesses drilled therein to different depths and representing a specific evaluation of said sample which can be read by said machine, said machine including a plurality of depressible pins positioned in a receptacle for engagement with said recesses, said pins being coupled to microswitches.

4. A teaching machine for teaching a student, said machine including means for permitting operation in two distinct modes, said machine including separate means permitting either a student or an instructor to preselect the mode of operation, said machine including means for accepting a sample for evaluation by both said machine and said student in accordance with a predetermined criterion, said sample being provided with precoded information which can be evaluated by the machine but not by the student, said sample containing other information which can be evaluated by the student but not by the machine, said machine including means for evaluating said precoded information and presenting said evaluation to said student, said machine including means for permitting the student to register his evaluation of the sample into the machine, said machine including means for presenting to the student the correctness or incorrectness of the student evaluation of the sample in comparison to the machine evaluation of the sample, said machine further including feedback means for presenting to the student a second evaluation of the sample based on precoded information stored in the machine, said second evaluation being based on the student and machine evaluations and on said precoded information and differing from said first evaluation.

5. A teaching machine for teaching learners on both a subjective and an objective basis, said machine including first means for interpreting coded information presented to said machine by a sample to be evaluated by said machine and by said learner according to a given criterion, said machine including second means for interpreting the same coded information presented to said machine by said sample, said first means including means for reading the coded information on the sample and responding to the learner input to the machine of the learner's interpretation of said sample to provide to the learner a presentation of the correctness or incorrectness of the learner's interpretation of the sample according to said given criterion, said second means including precoded information stored in said machine, said second means responding to both the student and machine interpretation of the sample and on the precoded information to provide the learner with a presentation based on a comparison of the learner's interpretation of the sample and a previous averaged interpretation of the sample by a body of experts which previous interpretation is stored as said precoded information, said machine having at least two different sets of control inputs for predetermining one of at least two modes of operation of said machine, said machine including means for presenting to said learner a cumulative total of the correctness and incorrectness of his first interpretations of said sample as represented by the learner input to the machine, said machine further including means for providing the learner with a presentation of the direction of error in evaluating said sample and for providing the learner with error correcting means, said one mode of operation enabling said learner to interpret said sample as the basis of accepting or rejecting said sample on the basis of a stated range of values presented to the learner by the machine, said other mode of operation enabling said learner to interpret said sample on the basis of selecting one from a plurality of values presented to said learner by the machine.

References Cited by the Examiner

UNITED STATES PATENTS

| | | | |
|---|---|---|---|
| 2,965,975 | 12/1960 | Briggs | 35—9 |
| 3,052,041 | 9/1962 | Luxton et al. | 35—9 |
| 3,077,038 | 2/1963 | Williams et al. | 35—9 |
| 3,100,351 | 8/1963 | Priednieks | 35—9 |

EUGENE R. CAPOZIO, *Primary Examiner.*

SHELDON M. BENDER, *Assistant Examiner.*